Figure 1:
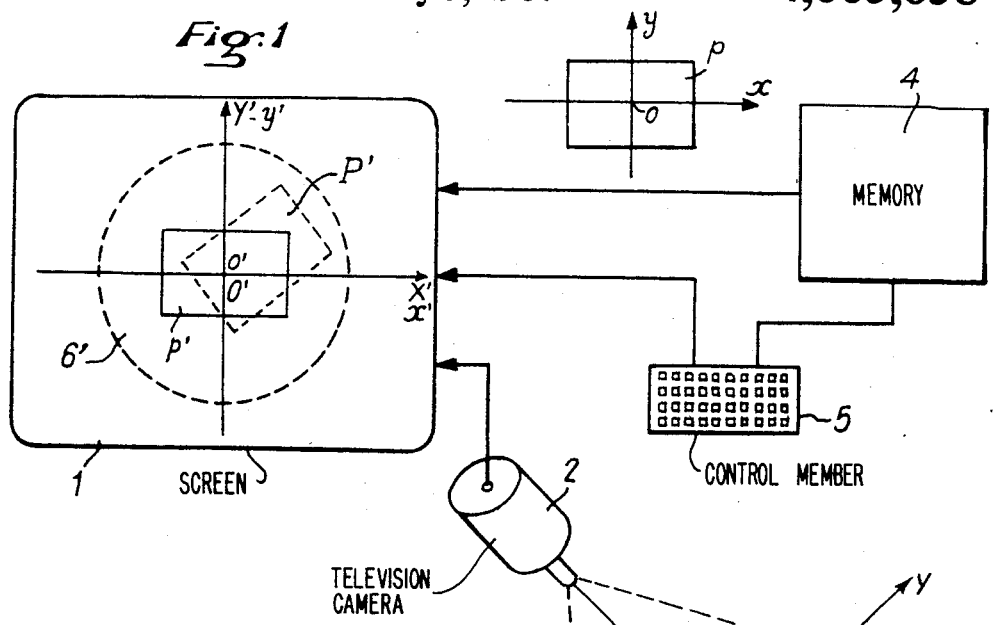

United States Patent [19]

Lanne et al.

[11] Patent Number: 4,663,658
[45] Date of Patent: May 5, 1987

[54] PROCESS AND DEVICE FOR ASSISTING THE POSITIONING OF WORKPIECES BY SUPERPOSITION OF IMAGES

[75] Inventors: Maurice Lanne, Marignane; Gérard Pons, Les Pennes-Mirabeau; Jacques Petit, Marseilles; Francis Pauly, Avignon, all of France

[73] Assignee: Societe Nationale Industrielle et Aerospatiale, Paris, France

[21] Appl. No.: 776,782

[22] Filed: Sep. 17, 1985

[30] Foreign Application Priority Data

Sep. 24, 1984 [FR] France ............................... 84 14605

[51] Int. Cl.$^4$ ............................................. H04N 7/18
[52] U.S. Cl. ..................................... 358/101; 358/93; 358/903; 901/47
[58] Field of Search ................. 358/101, 93, 107, 903; 356/401, 392, 393, 397; 901/47

[56] References Cited

U.S. PATENT DOCUMENTS

| | | | |
|---|---|---|---|
| 4,125,798 | 11/1978 | Miller | 318/574 |
| 4,437,603 | 3/1984 | Kobayashi et al. | 228/4.5 |
| 4,547,800 | 10/1985 | Masaki | 358/101 |
| 4,568,971 | 2/1986 | Alzmann | 358/101 |

*Primary Examiner*—Howard W. Britton
*Attorney, Agent, or Firm*—Fisher, Christen & Sabol

[57] ABSTRACT

This invention relates to a process and device for assisting positioning of workpieces by superposition of images, wherein there are displayed on a screen the image of the workpiece to be positioned and the image of a model positioned with respect to a marking system and the workpiece is displaced over its support until the image thereof is brought into superposition with the image of the model.

7 Claims, 2 Drawing Figures

PROCESS AND DEVICE FOR ASSISTING THE POSITIONING OF WORKPIECES BY SUPERPOSITION OF IMAGES

The present invention relates to a process and a device for assisting the positioning of workpieces by superposition of images. Its purpose is essentially to assist the manual positioning of workpieces to be machined and/or assembled, in order to simplify machining and assembly, by eliminating the corresponding tools or the prior tracing or workpieces to be positioned.

To this end, according to the invention, the process for assisting the positioning, with respect to a reference system, of a workpiece resting on a support, is noteworthy in that:

the image of said workpiece resting on said support is formed on the screen of a display apparatus connected to a image sensor;

there is displayed on said screen a fixed test pattern on which is superposed the image of said reference system viewed by said image sensor, in the event of said reference system being materialized on said support;

there is displayed on said screen the image of a model of said workpiece and the image of a marking system fixedly connected to said model, said marking system being similar to said reference system and said model occupying with respect to said marking system a relative position identical to that occupied by said workpiece with respect to said reference system, when said workpiece is correctly positioned on said support;

the image of said marking system of the model is brought in superposition with said fixed test pattern; and said workpiece is displaced over said support until its image on said screen occupies, with respect to said test pattern, the same relative position as the image of said model.

The images of said workpiece and of said model are arranged to have the same dimensions, with the result that correct positioning of the workpiece on the support is obtained when the image of the workpiece is brought into register with the image of the model.

Superposition of the image of the marking system of the model and of the fixed test pattern may be controlled or automatic.

A device for assisting positioning, with respect to a reference system, of a workpiece resting on a support, is advantageously noteworthy in that it comprises:

a display apparatus provided with a screen;

a image sensor capable of forming on said screen the image of said workpiece resting on said support;

means for showing on said screen a fixed test pattern on which is superposed the image of said reference system viewed by said image sensor, in the event of said reference system being materialized on said support;

means for showing on said screen the image of a model of said workpiece and the image of a marking system fixedly connected to said model, said marking system being similar to said reference system and said model occupying with respect to said marking system a relative position identical to that occupied by said workpiece with respect to said reference system, when said workpiece is correctly positioned on said support; and means for bringing the image of said marking system of the model in superposition with said fixed test pattern.

Such a device advantageously comprises a memory in which said model is stored.

In an advantageous embodiment, the device according to the invention comprises a central data base, in which said model is stored, a local computer adapted to dialogue with said central data base and a multiplexer receiving information from said local computer and said filming apparatus.

The invention will be more readily understood on reading the following description with reference to the accompanying drawings, in which:

FIG. 1 is a block diagram schematically illustrating the process and device according to the present invention.

Figure 2:
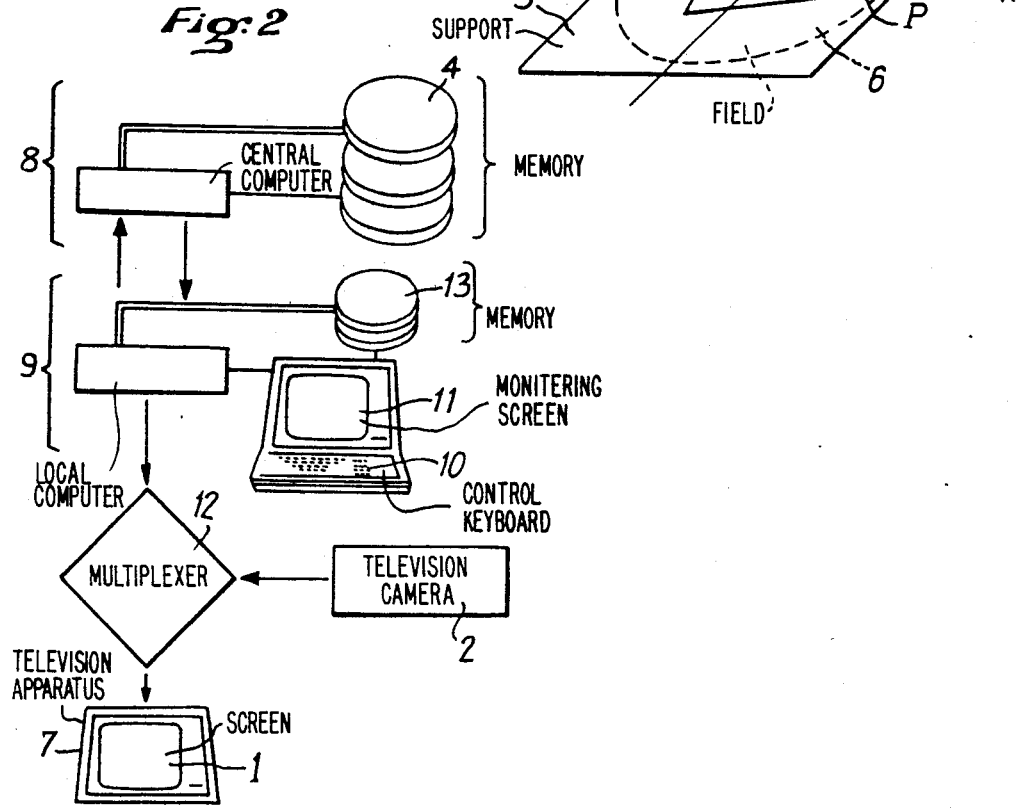

FIG. 2 schematically shows the structure of a device according to the invention, incorporated in a dataprocessing system for industrial production.

Referring now to the drawings, the device according to the invention, shown schematically in FIG. 1, comprises a television apparatus schematized by its screen 1 and connected to a television camera 2. The television camera 2 observes a workpiece P resting on a support 3 and having to be positioned with respect to a system of reference axes OX,OY connected to said support 3.

The image P' of the workpiece P thus appears on screen 1. Reference system OX,OY has been shown in Fig. 1 for reasons of convenience of the specification, but this reference system may, in fact, have no material reality.

The television apparatus also shows on its screen 1 a fixed test pattern O'X',O'Y' on which is exactly superposed the image of the reference system OX,OY viewed by camera 2, in the event of said reference system OX,OY being materialized on support 3.

Moreover, there appears on screen 1 the image p' of a model p of the workpiece P. The model p is for example stored in a memory 4 and addressed on demand to the television apparatus. This model p is connected in intangible manner to a system of marking axes ox,oy and it occupies, with respect to said marking system, a position identical to that occupied by the workpiece P with respect to the reference system OX,OY when it is correctly positioned on its support 3. In this way, the image o'x',o'y' of the marking system ox,oy also appears on screen 1.

. The various enlargements and adjustments are preferably selected so that, on screen 1, the images P' and p' have identical dimensions.

The image o'x', o'y' of the marking system ox,oy is brought into superposition with the fixed test pattern C'X',O'Y' either automatically by the television apparatus, or by voluntary control with the aid of a control member 5.

Consequently, on screen 1, the image p' of model p then occupies, with respect to the fixed test pattern O'X',O'Y', the position (illustrated in FIG. 1) that the workpiece P should occupy with respect to reference system OX,OY.

In order to position the workpiece P with respect to the reference system OX,OY, it therefore suffices to displace said workpiece over its support 3 until its image P' comes into exact superposition with the image p' of model p.

Of course, although FIG. 1 has shown the device on the assumption that the field 6 of the camera 2 were sufficiently wide to cover the whole of the workpiece P, it goes without saying that the camera may give on the screen 1 only a partial image of the workpiece P. In that case, correct positioning of this workpiece would be obtained by superposing outstanding points of image P' on the corresponding outstanding points of image p'.

FIG. 2 shows the block diagram of a device according to the invention, incorporated in a data-processing system for industrial production. It shows the television camera (bearing reference 7) provided with its screen 1, camera 2 and memory 4.

The memory 4 is the central memory of a central computer 8, linked with at least one local computer 9 provided with a control keyboard 10 (of which member 5 forms part) and a monitoring screen 11. The central computer 8 contains the data bases corresponding to models p.

The operator may dialogue with computer 9 and central computer 8 via keyboard 10. He introduces the identity of the desired workpiece. An image p' of the model thereof appears on the monitoring screen 11. The image p' is transmitted to the television apparatus 7 via a multiplexer 12 to which camera 2 is also connected. The image p' may be transmitted directly from the central computer 4 to the apparatus 7 or via a local memory 13.

When images p' and P' are in register, the operator validates the operation of positioning.

The invention thus makes it possible to establish a direct connection between design and production.

It enables the cycles of production to be reduced and eliminates errors in reproduction.

Moreover, it is easy to carry out, as it employs only existing equipment and does not need considerable development in data-processing.

What is claimed is:

1. A process for assisting the positioning, with respect to a reference system (OX,OY), of a workpiece resting on a support, comprising the following steps of:
    forming the image of said workpiece resting on said support on the screen of a display apparatus connected to a image sensor;
    displaying on said screen a fixed test pattern on which is superposed the image of said reference system (OX,OY) viewed by said image sensor, in the event of said reference system (OX,OY) being materialized on said support;
    displaying on said screen the image of a model of said workpiece and the image of a marking system (ox,oy) fixedly connected to said model, said marking system (ox,oy) being similar to said reference system (OX,OY) and said model occupying with respect to said marking system (ox,oy) a relative position identical to that occupied by said workpiece with respect to said reference system (OX-,OY), when said workpiece is correctly positioned on said support;
    bringing the image of said marking system (ox,oy) of the model in superposition with said fixed test pattern; and
    displaying said workpiece over said support until its image on said screen occupies, with respect to said test pattern, the same relative position as the image of said model.

2. The process of claim 1, wherein, on said screen, the images of the workpiece and of the model have the same dimensions, with the result that correct positioning of the workpiece on the support is obtained when the image of the workpiece is brought into register with the image of the model.

3. The process of claim 1, wherein the image of the marking system (ox,oy) of the model is brought into superposition with the fixed test pattern by voluntary action of an operator on a control member.

4. The process of claim 1, wherein the image of the marking system (ox,oy) of the model is brought into superposition with the fixed test pattern by automatic action of the display apparatus.

5. A device for assisting positioning, with respect to a reference system (OX,OY), of a workpiece resting on a support, wherein it comprises:
    a display apparatus provided with a screen;
    a image sensor capable of forming on said screen the image of said workpiece resting on said support;
    means for showing on said screen a fixed test pattern on which is superposed the image of said reference system (OX,OY) viewed by said image sensor, in the event of said reference system (OX,OY) being materialized on said support;
    means for showing on said screen the image of a model of said workpiece and the image of a marking system (ox,oy) fixedly connected to said model, said marking system (ox,oy) being similar to said reference system (OX,OY) and said model occupying with respect to said marking ystem (ox,oy) a relative position indentical to that occupied by said workpiece with respect to said reference system (OX,OY), when said workpiece is correctly positioned on said support; and
    means for bringing the image of said marking system (ox,oy) of the model in superposition with said fixed test pattern.

6. The device of claim 5, wherein it comprises a memory in which said model is stored.

7. The device of claim 6, wherein it compirses a central data base, in which said model is stored, a local computer adapted to dialogue with said central data base and a multiplexer receiving information from said local computer and said filming apparatus.

* * * * *